United States Patent
Fischer

(10) Patent No.: US 9,640,954 B2
(45) Date of Patent: May 2, 2017

(54) WIRE-PROCESSING DEVICE WITH DEPOSIT UNIT

(75) Inventor: Daniel Fischer, Luzern (CH)

(73) Assignee: Komax Holding AG, Dierikon (CH)

( * ) Notice: Subject to any disclaimer, the term of this patent is extended or adjusted under 35 U.S.C. 154(b) by 982 days.

(21) Appl. No.: 13/248,740

(22) Filed: Sep. 29, 2011

(65) Prior Publication Data
US 2012/0090723 A1    Apr. 19, 2012

(30) Foreign Application Priority Data

Oct. 13, 2010 (EP) .................................. 10187463

(51) Int. Cl.
H02G 1/12        (2006.01)
H01R 43/28       (2006.01)

(52) U.S. Cl.
CPC ........... *H02G 1/1248* (2013.01); *H01R 43/28* (2013.01)

(58) Field of Classification Search
CPC ...... B65G 17/36; B65G 47/962; B65G 47/38; B65G 2201/0258; B21F 33/00; H01R 43/28; H01R 43/033; H02G 1/1248
USPC .......... 140/123, 139, 140; 29/430, 505, 872, 29/404, 559, 753; 72/134, 169, 0.257, 72/456, 428, 404, 405.1, 405.01, 405.08, 72/419, 426, 702, 347, 348, 379.2, 72/402.01; 414/404, 405; 198/370.04, 198/370.05, 867.11, 803.14, 587, 688.1, 198/721, 750.1, 750.2; 57/281
See application file for complete search history.

(56) References Cited

U.S. PATENT DOCUMENTS

| | | | | |
|---|---|---|---|---|
| 3,679,111 A * | 7/1972 | Volans | ............................ | 225/97 |
| 4,496,037 A | 1/1985 | Spamer | | |
| 4,699,208 A * | 10/1987 | Wolf et al. | ...................... | 165/47 |
| 5,644,932 A * | 7/1997 | Dunbobbin et al. | ........... | 62/640 |
| 5,690,671 A * | 11/1997 | McGurk et al. | .............. | 606/200 |
| 5,740,608 A * | 4/1998 | Long | ............................... | 29/863 |
| 5,944,065 A * | 8/1999 | Tanoory et al. | .............. | 140/140 |
| 5,960,622 A * | 10/1999 | Koch et al. | ..................... | 57/281 |
| 5,990,437 A * | 11/1999 | Coutant et al. | ............... | 209/583 |
| 6,036,023 A * | 3/2000 | Pfahnl et al. | ................. | 206/725 |
| 6,509,084 B2 * | 1/2003 | Sturtevant et al. | ........... | 428/141 |
| 6,658,726 B1 * | 12/2003 | Conte | ............................. | 29/753 |
| 6,664,780 B2 * | 12/2003 | Dobbs et al. | ................. | 324/173 |
| 6,745,609 B2 * | 6/2004 | Garnett et al. | .................. | 72/350 |
| 6,886,699 B2 * | 5/2005 | Johnson et al. | ............. | 211/59.3 |

(Continued)

FOREIGN PATENT DOCUMENTS

DE     8901210 U1    3/1989
DE     19624973 A1   1/1998

(Continued)

*Primary Examiner* — Teresa M Ekiert
(74) *Attorney, Agent, or Firm* — Fraser Clemens Martin & Miller LLC; William J. Clemens

(57) ABSTRACT

A swivel-arm with a gripper in a wire-processing machine transfers a processed wire to a collection tray. The collection tray and an unloading tray have a channel-like shape. The swivel-arm swivels the processed, trailing wire-end over the collection tray, whereby the wire, with the aid of the conveyor belt that runs in the direction of the arrow, falls into the collection tray. The collection tray serves as temporary store and collects a specified number of completed processed wires that corresponds to a production lot, and transfers the production lot to the unloading tray.

15 Claims, 5 Drawing Sheets

(56) References Cited

U.S. PATENT DOCUMENTS

| | | | | |
|---|---|---|---|---|
| 7,530,567 | B2* | 5/2009 | Bober et al. | 271/220 |
| 7,637,005 | B2* | 12/2009 | Lustenberger et al. | 29/753 |
| 8,550,222 | B2* | 10/2013 | Browne et al. | 188/267.1 |
| 8,563,114 | B2* | 10/2013 | Manninen | 428/132 |
| 2005/0103205 | A1* | 5/2005 | Franzolin | 99/339 |
| 2008/0087523 | A1* | 4/2008 | Feierabend et al. | 198/409 |

FOREIGN PATENT DOCUMENTS

| | | | |
|---|---|---|---|
| EP | 0788200 | A2 | 8/1997 |
| EP | 2028732 | A2 | 2/2009 |

\* cited by examiner

WIRE-PROCESSING DEVICE WITH DEPOSIT UNIT

CROSS-REFERENCE TO RELATED APPLICATION

This application claims priority to European Patent Application No. 10187463.4, filed Oct. 13, 2010, which is incorporated herein by reference.

FIELD

The disclosure relates to a wire-processing device.

BACKGROUND

From patent application EP 2 028 732 A2, a wire-processing device has become known, by means of which wire-ends can be processed. A first swivel-arm with gripper grasps the leading wire-end and feeds the latter to processing stations for processing, wherein the wire is cut, stripped of insulation, and has crimped onto it a contact. The wire is then advanced to a desired length, the advancing wire-end being pulled off by conveyor belt. By means of a second swivel-arm with gripper, the trailing wire-end is then fed to further processing stations for processing. After the processing, with the gripper, the second swivel-arm swivels the trailing wire-end over a deposit unit, whereby the processed wire, with the aid of the running conveyor belt, falls into the deposit unit. With this type of wire-processing device there is usually a need to transport the processed wire as efficiently as possible.

From patent application EP 0 788 200 A2 a wire-depositing apparatus has become known in which the processed wires are thrown into a wire-deposit that functions on the principle of a winged wheel. The deposit unit, which can be rotated about an axis, has, arranged along the axis, wings, each wing together with its adjacent wing forming a collection tray. With one wing in the vertical position, two collection trays can collect processed wires simultaneously. If the collection trays are full, and/or the production lot has been produced, the deposit unit is rotated further and the collection trays are emptied.

SUMMARY

At least some embodiments comprise a wire-processing device with wire-deposit, which operates reliably for any type of wire, and any processed length of wire, and allows a reliable deposition of wires.

At least some embodiments comprise a wire-processing device with processing stations for processing a wire, with a deposit unit to collect processed wires, wherein the deposit unit has a collection tray and an unloading tray, and the processed wires of a production lot can be deposited in the collection tray and then transferred to the unloading tray, and the collection tray has, on the surface that faces the wires, a surface structure in the form of elevations, on points of which the wires rest, and over which the wires move into the unloading tray when the collection tray is swiveled The deposit unit of the wire-processing device consists of a collection tray and an unloading tray. The collection tray serves as a temporary store and allows a specified number of completed processed wires to be collected. The specified number of completed processed wires is also referred to as a production lot, a production lot being transferred to the unloading tray either automatically, or manually by an operator, from where the production lot can be removed, for example by hand, while the next production lot is being produced.

Transfer of the wire to the unloading tray normally takes place by the collection tray being swiveled downwards, the wires thereby sliding into the unloading tray. The collection tray is then swiveled upwards again, and is again ready to collect the next production lot. Wires of small cross-section, and therefore low weight per unit of length, often have the property of adhering to the collection tray, as a result of which the production lot is not completely transferred to the unloading tray. This results in incomplete production lots in the unloading tray, and/or disruptions of production. The cause of the undesired adhesion of the wires to the collection tray is, for example, electrostatic charge, or the greater adhesion of soft insulation materials of the wires.

The adhesion of the wires to the collection tray can be avoided by a visible structure on the surface of the collection tray that faces the wires. The collection tray is normally made of smooth steel plate, and, as structure, by means of embossing, deep-drawing, welding, milling, etc., the surface of the steel plate that faces the wires is provided with ribs, or studs, or reinforcers, etc. The wires rest at points on the ribs, studs, or reinforcers, etc. The height of the ribs, studs, or reinforcers, etc. relative to the smooth sheet-metal is specially designed for wires of small cross-section. The pliable wire should generally rest on as small an area of the collection tray as possible. If the distance between the ribs is selected too large, or the height of the ribs is selected too small, the desired effect is not achieved. In the ideal case, the wire should rest only on the ribs, without touching the deposit unit between the ribs. In at least some cases of wires of larger cross section and corresponding weight per unit of length, no problems of adhesion that interfere with production occur.

In the field of wire-processing, processing is understood to mean any processing wires, such as, for example, cutting wires to a specified length, twisting at least two wires together, processing wires at the wire-ends, as for example, insulation-stripping, crimping contacts, mounting seals, inserting crimped contacts into connector housings, etc.

BRIEF DESCRIPTION OF THE DRAWINGS

The disclosed embodiments are explained in more detail by reference to the attached figures.

Shown are in

FIG. 1 an exemplary embodiment of a wire-processing machine with two swivel-arms and a deposit unit;

FIG. 2 an exemplary swivel-arm when depositing a wire;

FIG. 3 details of an exemplary deposit unit with structured surface;

FIG. 4 an exemplary collection tray with a loading section;

FIG. 5 an exemplary loading section with ribs; and

FIG. 6 an exemplary loading section with studs.

DETAILED DESCRIPTION

Figure 1:
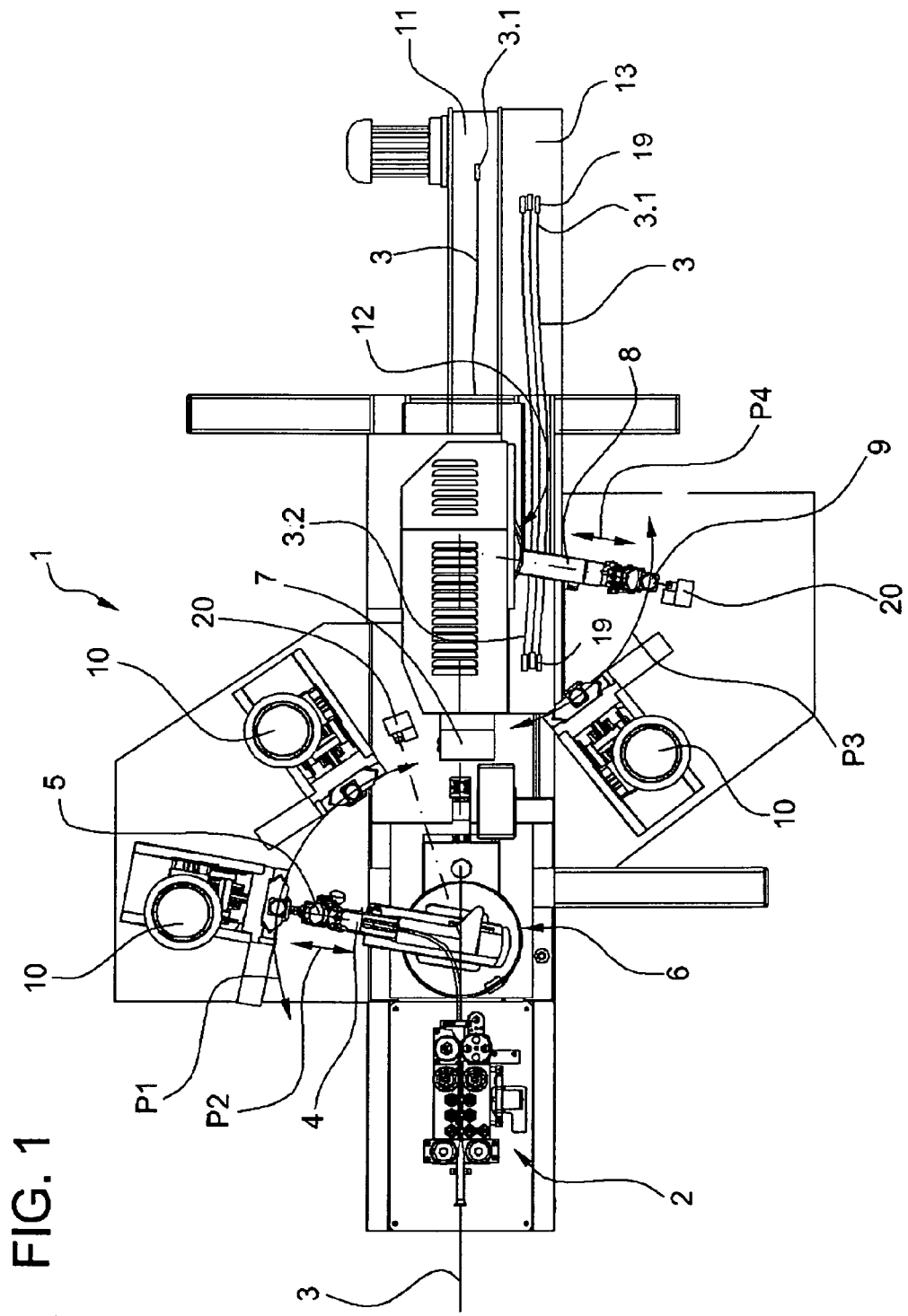

FIG. 1 shows an exemplary embodiment of a wire-processing machine 1 with a wire-advancing device that is embodied as a belt-drive 2, the belt-drive 2 feeding a wire 3 to a first swivel-arm 4 with a first gripper 5. By means of first drives 6, the first swivel-arm 4 can be set in a swivel motion symbolized by an arrow P1, and/or in a linear motion symbolized by an arrow P2. By means of separation/insulation-stripping blades 7, the wire can be separated and/or stripped of insulation.

In addition, the wire-processing machine 1 has a second swivel-arm 8 with a second gripper 9. By means of second drives 12, the second swivel-arm 8 can be set in a swivel motion symbolized by an arrow P3, and/or in a linear motion symbolized by an arrow P4. By means of turning movement P1 and linear movement P2, the first swivel-arm 4 as feeding device serves leading wire-ends 3.1 to processing stations 10 (for example crimp presses and/or seal-mounters) that are arranged to the side of the longitudinal axis of the wire. By means of turning movement P3 and linear movement P4, the second swivel-arm 8 that is set in motion by the second drive 12 serves, as feeding device, trailing wire-ends 3.2 to processing stations 10 (for example crimp presses and/or seal-mounters) which are arranged to the side of the longitudinal axis of the wire.

After processing the leading wire-end 3.1, the wire 3 is transported further by means of a conveyor belt 11. The second gripper 9 grasps the trailing wire-end 3.2, following which the wire 3 is separated and the trailing wire-end 3.2 is stripped of insulation and fed to the processing stations 10. After processing the trailing wire-end 3.2, the wire 3 arrives in a deposit unit 13. Indicated with 20 is a holding device, which serves to test the wire-end connection (for example a crimped connection between a crimp contact 19 and the wire 3), which is produced in the automated wire-processing process. The test is performed by measuring a pull-out force, the wire-end connection being clamped in the holding apparatus and the gripper pulling on the wire until the connection breaks.

Figure 2:
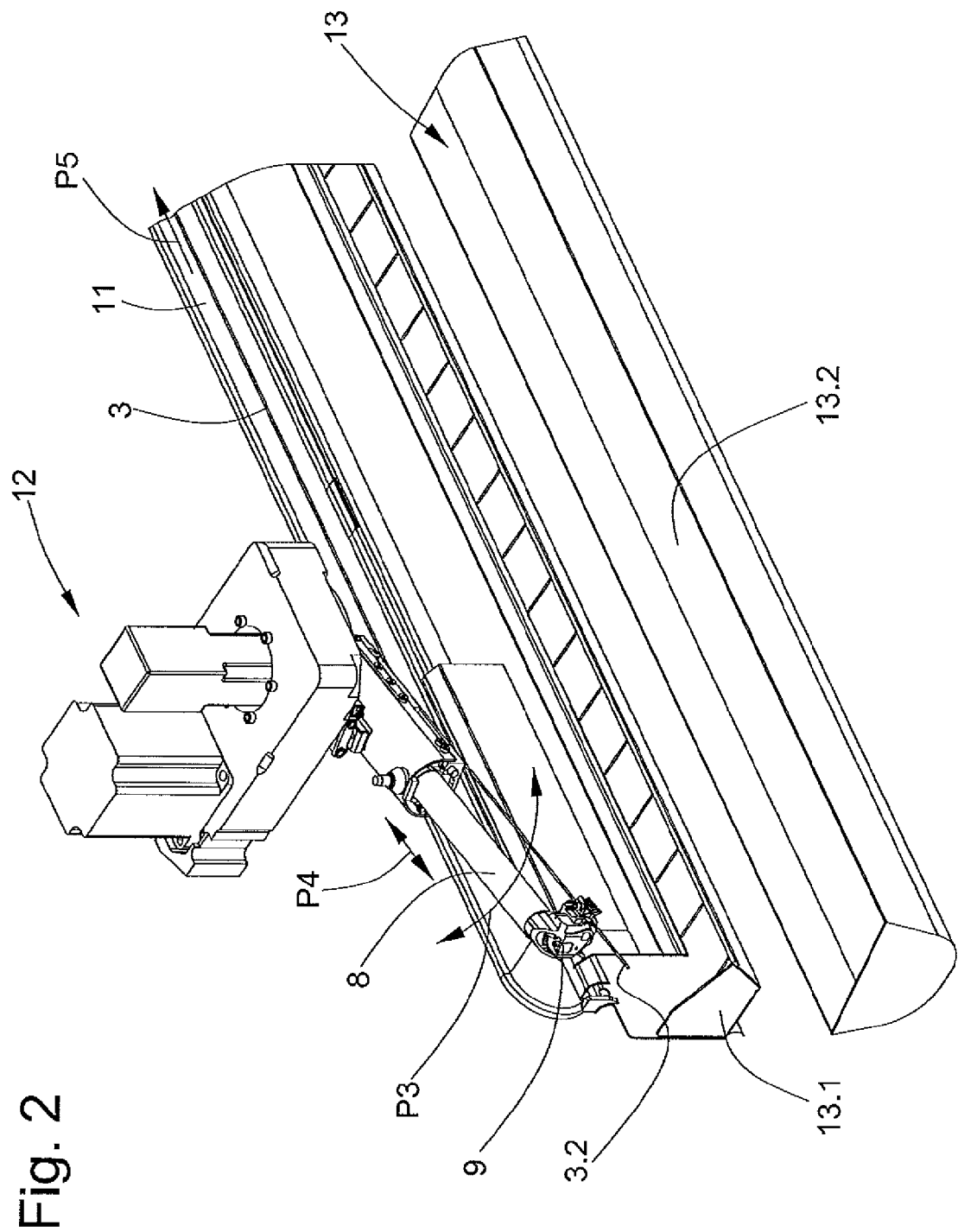

FIG. 2 shows the second swivel-arm 8 when laying the wire 3 into the deposit unit 13, which consists of a collection tray 13.1 and an unloading tray 13.2. The collection tray 13.1 and also the unloading tray 13.2 have, for example, a channel-like or trough-like shape. The second swivel-arm 8 has swiveled the processed, trailing wire-end 3.2 over the collection tray 13.1, whereby the wire 3, with the aid of the conveyor belt 11 that runs in the direction of the arrow P5, falls to be caught in the collection tray 13.1. The collection tray 13.1 serves as a temporary store and collects a specified number of completed processed wires 3 that corresponds to the production lot. After the specified number of completely processed wires 3 is attained, triggered either automatically or manually by an operator, for example by swiveling the collection tray 13.1 downwards, as shown in FIG. 3, the production lot is transferred to the unloading tray 13.2.

Figure 3:
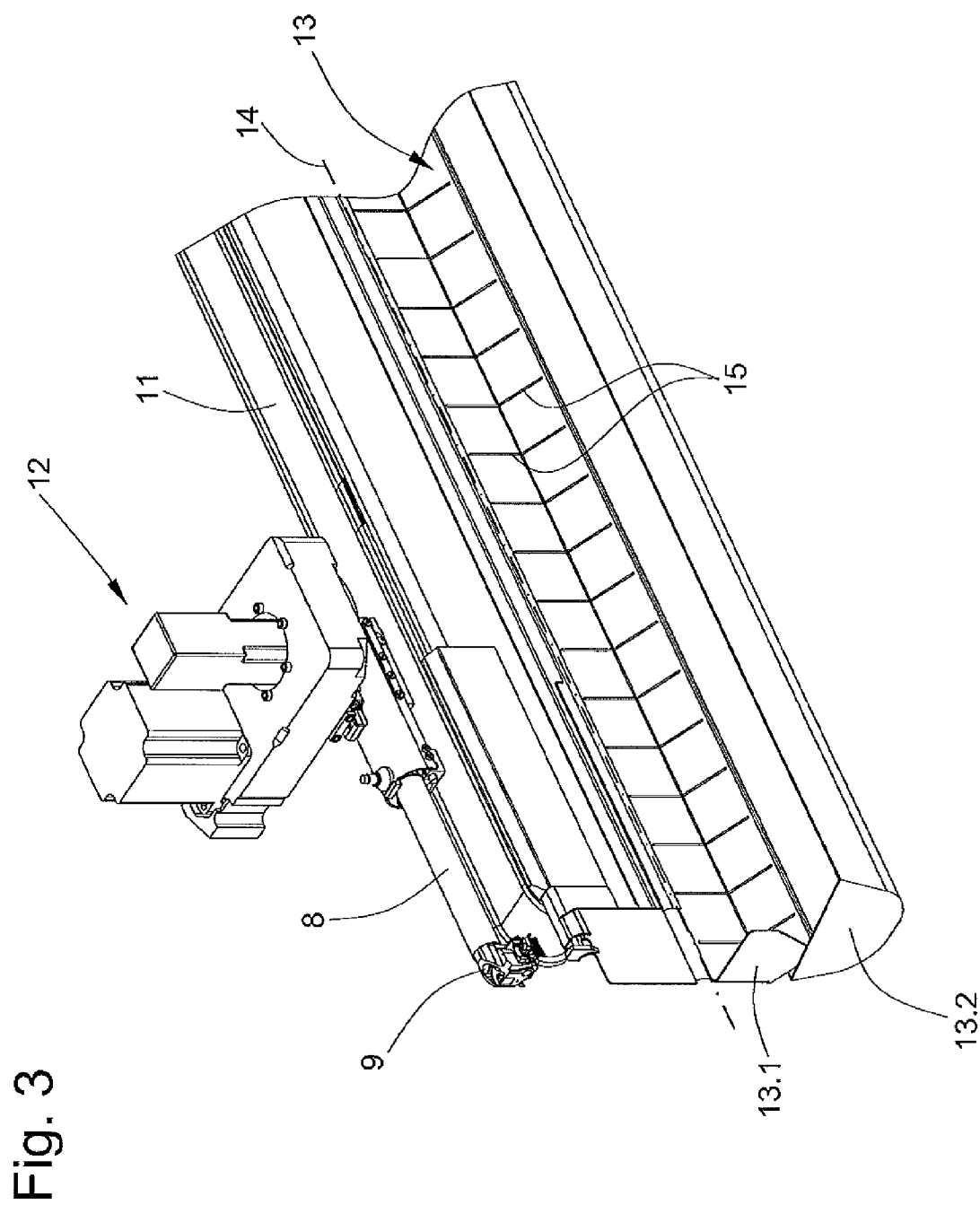

FIG. 3 shows details of the downward-swiveled collection tray 13.1. The collection tray 13.1 is swivelable about a first axis 14 by means of, for example, a not-shown pneumatic drive. Other swivel-drives such as, for example, electromagnetic drives, are also possible.

Provided on the surface of the collection tray 13.1 that faces the wires 3 that are resting in the collection tray 13.1 is a structure, in the form of elevations, which is visible to the unaided eye. The elevations can be, for example, ribs 15. On the surface that faces the wires, the ribs 15 form a visible surface structure. The processed wires 3 predominantly rest not on the smooth sheet metal of the collection tray 13.1, but rest predominantly at points on the narrow ribs 15, which run, for example, perpendicular to the processed wires 3, in at least some embodiments, the height of the ribs 15 relative to the smooth steel plate is designed specially for wires with a small external diameter and can be, for example, 0.5 mm to 1 mm. Tests have shown that, in at least some embodiments, the distance between the ribs should not exceed 80 mm. For smaller distances between the ribs, the said rib height can be smaller. In the case of wires with an external diameter of more than 1.2 mm and corresponding weight per unit of length, no problems of adhesion that interfere with production occur. Between two ribs 15, the processed wires 3 rest essentially not on the smooth sheet metal of the collection tray 13.1, but hang from rib 15 to rib 15 and rest predominantly at points on the ribs 15.

Figure 6:
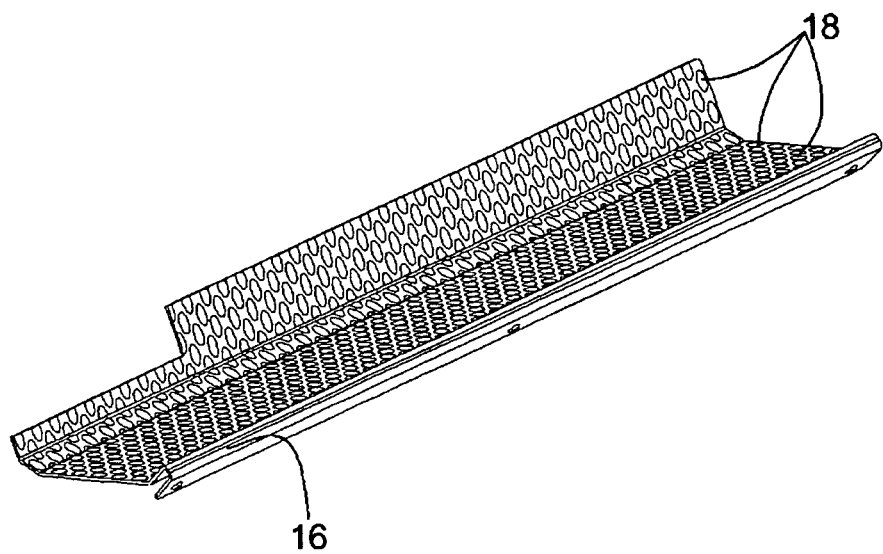

When the collection tray 13.1 is swiveled into the position shown in FIG. 3, the wires 3 slide on the ribs into the unloading tray 13.2. With the visible surface structure, the excess adhesion of the wires 3 to the smooth surface of the collection tray 13.1 can be reduced. The surface structure or the elevations can be embodied, for example, as shown in FIG. 6, and, instead of the ribs 15, can have studs 18 with, for example, a height of 0.2 mm, or reinforcers with, for example, a height of 0.2 mm. At least on the side facing the wires, the surface of a stud 18 or reinforcer is domed, comparable to the surface of a convex lens, with the wires 3 resting at points on the domes. As illustrated by the example of the studs or reinforcers, the elevations need not run perpendicular to the direction of sliding of the wire, and need not be continuous.

Figure 4:
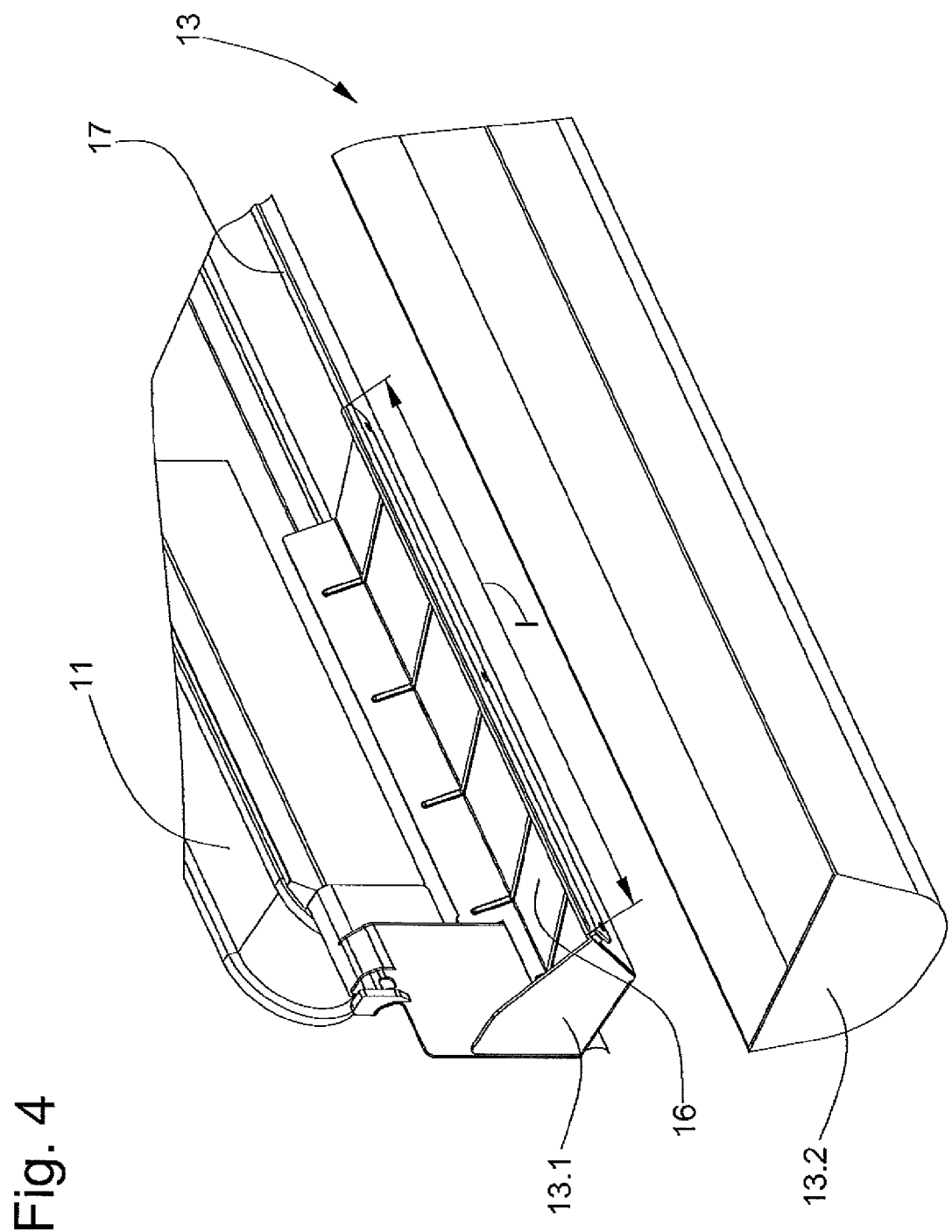
Figure 5:
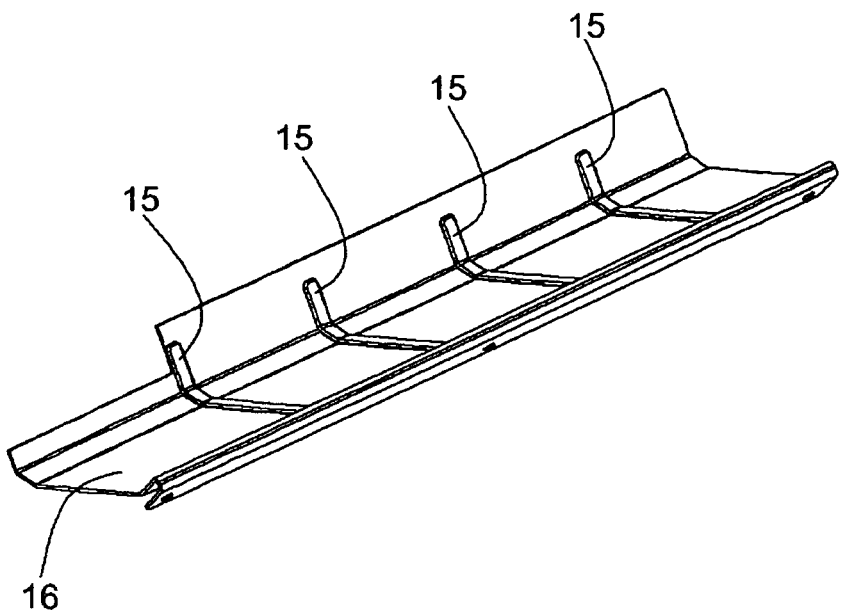

FIG. 4 shows an exemplary embodiment of the collection tray 13.1 with a loading section 16. The loading section 16 can be set on the smooth wall 17 or surface of the collection tray 13.1 and joined to the latter. The loading section 16 has a surface structure as shown in FIG. 5, which is comparable to the surface structure of FIG. 3. The surface structure can also be embodied as shown in FIG. 6, or have reinforcers.

The length l of the loading section 16 can be adapted to the length of the wire. If, for example, wires with a short length are processed, a loading section 16 as shown in FIGS. 4 and 5 is sufficient, wherein the length l can be a fraction of the total length of the collection tray 13.1. The loading section 16 can also be additionally embodied in such manner that, to improve the sliding-off of the wires, the surface over which the wires 3 slide off is set at a specified angle relative to the wall 17 of the collection tray 13.1.

Having illustrated and described the principles of the disclosed technologies, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only examples of the technologies and should not be taken as limiting the scope of the invention. Rather, the scope of the invention is defined by the following claims and their equivalents. I therefore claim as my invention all that comes within the scope and spirit of these claims.

I claim:

1. A wire-processing device, comprising:
   one or more processing stations for processing wires; and
   a deposit unit, the deposit unit comprising a collection tray and an unloading tray, the collection tray configured to swivel, and the collection tray comprising a surface with a first longitudinal axis, the surface comprising a plurality of elevations, the elevations comprising ribs or studs arranged in a spaced apart configuration along the first longitudinal axis, each of the elevations being elongate and having a second longitudinal axis, the second longitudinal axis transverse to the first longitudinal axis, the elevations being configured to receive the processed wires from the one or more processing stations before the processed wires are moved into the unloading tray by a swiveling of the collection tray.

2. The wire-processing device of claim 1, the elevations comprising ribs.

3. The wire-processing device of claim 2, the ribs having a height of 0.5 mm to 1 mm and a distance between the ribs of 80 mm.

4. The wire-processing device of claim 1, the elevations comprising studs with a generally oval shape.

5. The wire-processing device of claim 4, the studs having a height of 0.2 mm.

6. The wire-processing device of claim 1, the collection tray further comprising a loading section, the loading section comprising the surface comprising the plurality of elevations, the loading section adapted to be set on and joined to a wall of the collection tray having no elevations.

7. The wire-processing device of claim 6, the loading section having a length approximately equal to a length of the processed wires, the loading section length being less than a length of the collection tray.

8. A wire-processing device with processing stations for processing wires, comprising:
a deposit unit to collect the processed wires from the processing stations, wherein the deposit unit has a collection tray and an unloading tray, the collection tray configured to swivel and having a surface with a first longitudinal axis, and the processed wires of a production lot deposited in the collection tray are then transferred to the unloading tray, and the collection tray has on the surface that faces the processed wires a surface structure in the form of elevations, on points of which the processed wires rest, and over which the processed wires move into the unloading tray when the collection tray is swiveled, the elevations comprising ribs or studs arranged in a spaced apart configuration along the first longitudinal axis, each of the elevations being elongate and having a second longitudinal axis, the second longitudinal axis transverse to the first longitudinal axis.

9. The wire-processing device of claim 8 including a loading section having the surface structure with the elevations, the loading section adapted to be set on and joined to a smooth wall of the collection tray.

10. The wire-processing device of claim 9 wherein the loading section has a length approximately equal to a length of the processed wires, the loading section length being less than a length of the collection tray.

11. A wire-processing device, comprising:
at least one processing station for processing a wire to form a processed wire having a longitudinal axis; and
a deposit unit including a collection tray and an unloading tray, the collection tray configured to swivel and having a surface with a first longitudinal axis and a plurality of elevations arranged in a spaced apart configuration along the first longitudinal axis of the collection tray, each of the elevations being a rib or a stud extending transverse to the longitudinal axis of the surface, each of the elevations being elongate and having a second longitudinal axis, the second longitudinal axis transverse to the first longitudinal axis, wherein the processed wire is received from the at least one processing station and rests on the elevations with the longitudinal axis of the processed wire oriented in a direction of the first longitudinal axis of the surface, and the collection tray swivels about a swivel axis extending parallel to the first longitudinal axis of the surface to move the processed wire from the collection tray into the unloading tray.

12. The wire-processing device of claim 11 wherein the collection tray has a loading section that includes the surface and the plurality of elevations, the loading section adapted to be set on and joined to a wall of the collection tray having no elevations.

13. The wire-processing device of claim 12 wherein the loading section has a length approximately equal to a length of the processed wire, the loading section length being less than a length of the collection tray.

14. A wire-processing device, comprising:
one or more processing stations for processing wires; and
a deposit unit, the deposit unit comprising a collection tray and an unloading tray, the collection tray configured to swivel, and the collection tray comprising a surface with a first longitudinal axis, the surface comprising a plurality of elevations, the elevations comprising studs arranged in a spaced apart configuration along the first longitudinal axis, the studs further arranged in rows on the surface, each of the rows having a second longitudinal axis, the second longitudinal axis transverse to the first longitudinal axis, the studs being configured to receive the processed wires from the one or more processing stations before the processed wires are moved into the unloading tray by a swiveling of the collection tray.

15. The wire-processing device of claim 14, wherein a surface of each of the studs is domed.

* * * * *